United States Patent
Kumar KC et al.

(10) Patent No.: US 10,336,156 B1
(45) Date of Patent: Jul. 2, 2019

(54) PLUMBING LINE HANGERS

(71) Applicants: Nagesh Kumar KC, Chennai (IN); Sathish Kumar Sampath Kumar, Chennai (IN); Sudhakar Reddy Atala, Chennai (IN)

(72) Inventors: Nagesh Kumar KC, Chennai (IN); Sathish Kumar Sampath Kumar, Chennai (IN); Sudhakar Reddy Atala, Chennai (IN)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/861,738

(22) Filed: Jan. 4, 2018

(51) Int. Cl.
*B60H 1/00* (2006.01)
*F16L 3/22* (2006.01)
*F16L 3/133* (2006.01)
*F24F 13/32* (2006.01)

(52) U.S. Cl.
CPC ..... *B60H 1/00557* (2013.01); *B60H 1/00028* (2013.01); *F16L 3/133* (2013.01); *F16L 3/221* (2013.01); *B60H 2001/00078* (2013.01); *F24F 13/32* (2013.01)

(58) Field of Classification Search
CPC ............ B61H 1/00557; B60H 1/00028; B60H 200/00078; B60H 1/00557; B60H 2001/00078; F16L 3/133; F16L 3/221; F16M 3/221; F24F 13/32; F01N 13/1822; F01N 13/1811; F01N 13/1805
USPC ............... 248/302, 58, 62, 49–74.5
See application file for complete search history.

(56) References Cited

U.S. PATENT DOCUMENTS

| | | | | |
|---|---|---|---|---|
| 2,291,148 | A * | 7/1942 | Carson | F16L 3/14 174/159 |
| 2,339,992 | A | 1/1944 | Hohmeister | |
| 2,384,440 | A * | 9/1945 | Carr | H02G 7/10 248/61 |
| 2,636,703 | A * | 4/1953 | Wallans | F16L 3/14 248/58 |
| 2,683,578 | A * | 7/1954 | Rainey | H01B 17/306 174/146 |
| 2,842,218 | A * | 7/1958 | Bradbury | F01N 13/1822 180/296 |
| 3,782,672 | A * | 1/1974 | Larson | A47K 10/10 248/302 |
| 4,690,356 | A | 9/1987 | Koppensteiner et al. | |
| 5,005,789 | A * | 4/1991 | Jones | F16L 3/133 248/58 |
| 5,063,721 | A | 11/1991 | Larsson | |
| 8,136,786 | B2 * | 3/2012 | Kepes | A47B 97/08 248/166 |
| 2003/0173470 | A1 * | 9/2003 | Geiger | F16L 3/223 248/55 |
| 2006/0065684 | A1 * | 3/2006 | Houcek | A45F 5/02 224/269 |
| 2009/0101763 | A1 * | 4/2009 | Newcomb | H02G 3/30 248/58 |
| 2011/0089294 | A1 * | 4/2011 | Buytaert | F16L 3/133 248/58 |

(Continued)

Primary Examiner — Christopher Garft
(74) Attorney, Agent, or Firm — Ralph E. Smith

(57) ABSTRACT

A hanger for securing an HVAC fluid line to a vehicle includes a rigid wire having a first end and a second end. The first end is formed to define a first aperture configured to receive a first fastener to couple the first end to the vehicle. The second end is configured to support the HVAC fluid line in a desired orientation.

6 Claims, 3 Drawing Sheets

(56) References Cited

U.S. PATENT DOCUMENTS

2014/0262142 A1 9/2014 Vargas et al.

* cited by examiner

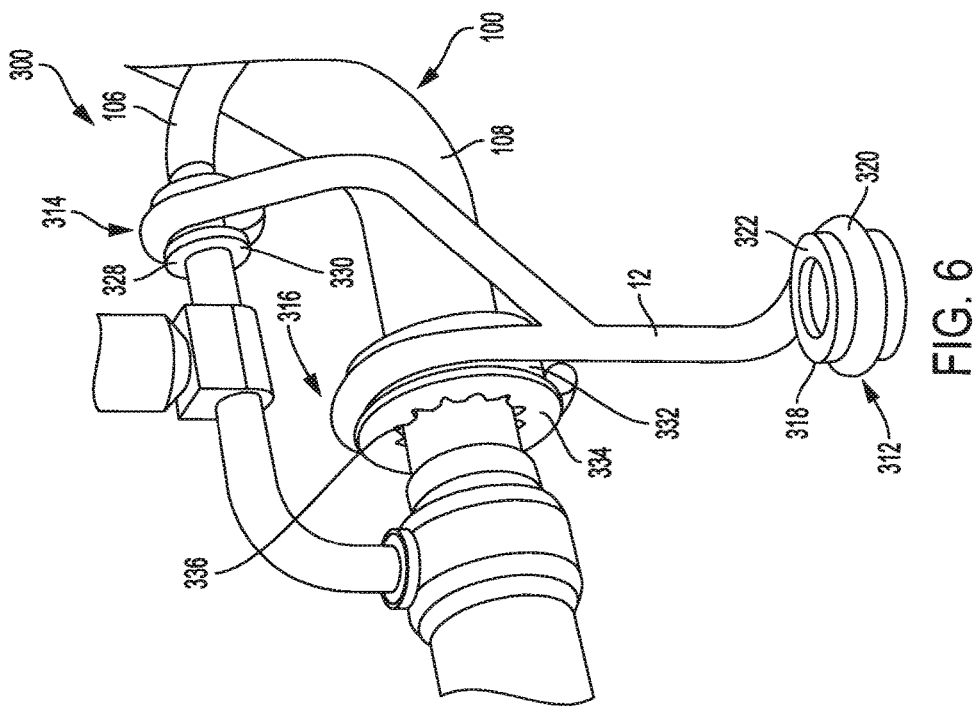
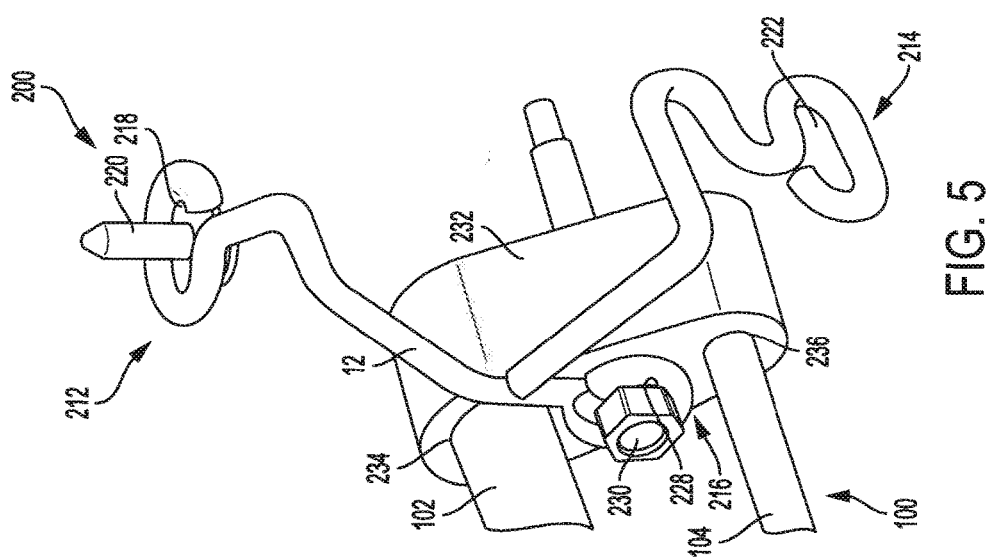

PLUMBING LINE HANGERS

FIELD

The present application relates generally to fluid line hangers, more particularly, to hangers for vehicle AC plumbing lines.

BACKGROUND

Vehicles typically include heating, venting, and air conditioning (HVAC) systems to provide temperature control and ventilation for a vehicle cabin. Fluid lines of the HVAC system are typically secured to the vehicle with specially manufactured brackets. However, such manufacturing processes can be complex and expensive. For example, FIG. 1 illustrates a prior art fluid line bracket 900 configured to secure AC plumbing lines in a vehicle. The prior art fluid line bracket 900 is formed from sheet metal and stamped into complex shapes in expensive press tools. Some prior art fluid line brackets, such as bracket 900, even require additional reinforcements to support the fluid lines, thereby increasing weight, cost, and manufacturing complexity. While such fluid line brackets do work well for their intended purpose, it is desirable to provide continuous improvement in the relevant art.

SUMMARY

According to one example aspect of the invention, a hanger for securing an HVAC fluid line to a vehicle is provided. The hanger includes, in one exemplary implementation, a rigid wire having a first end and a second end. The first end is formed to define a first aperture configured to receive a first fastener to couple the first end to the vehicle. The second end is configured to support the HVAC fluid line in a desired orientation.

In addition to the foregoing, the described hanger may include one or more of the following features: wherein the second end is formed to define a second aperture configured to receive (i) the HVAC fluid line or (ii) at least a portion of a device configured to receive the HVAC fluid line; an isolator disposed within the first aperture, the isolator configured to reduce noise, vibration, and harshness between the vehicle and the rigid wire; wherein the isolator is an elastomeric isolator disposed about a bushing; an isolator disposed within the second aperture, the isolator configured to receive the HVAC fluid line and reduce noise, vibration, and harshness between the HVAC fluid line and the rigid wire; and wherein the isolator defines a third aperture configured to receive the HVAC fluid line.

In addition to the foregoing, the described hanger may include one or more of the following features: wherein the isolator defines a fourth aperture and the HVAC fluid line comprises a first HVAC fluid line and a second HVAC fluid line, the first HVAC fluid line received within the third aperture and the second HVAC fluid line received within the fourth aperture; wherein the isolator is an elastomeric isolator; wherein the rigid wire is formed from a continuous rigid wire with a constant solid circular cross-section or a constant hollow circular cross-section; wherein the rigid wire is formed from a continuous rigid wire with a solid rectangular cross-section; and wherein the rigid wire is formed from a continuous rigid wire with a hollow rectangular cross-section.

In addition to the foregoing, the described hanger may include one or more of the following features: wherein the rigid wire includes a third end branched from a portion of the rigid wire extending between the first and second ends; wherein the third end is formed to define a third aperture configured to receive a third fastener to couple the third end to the vehicle; an isolator disposed within the third aperture, the isolator configured to reduce noise, vibration, and harshness between the vehicle and the rigid wire; wherein the third end is formed to define a third aperture configured to receive the HVAC fluid line such that the third end supports the HVAC fluid line in a desired orientation; wherein the third aperture is configured to receive a second isolator, the second isolator configured to reduce noise, vibration, and harshness between the HVAC fluid line and the rigid wire; and wherein the hanger formed from the rigid wire includes an absence of any sheet metal.

According to another example aspect of the invention, a vehicle is provided. The vehicle includes, in one exemplary implementation, a body, an HVAC system having at least one HVAC fluid line, and a hanger configured to couple the at least one HVAC fluid line to the body. The hanger includes a rigid wire having a first end and a second end, the first end formed to define a first aperture, and the second end formed to define a second aperture, a first isolator disposed within the first aperture and configured to reduce noise, vibration, and harshness between the body and the rigid wire, a fastener extending through the first isolator and first aperture to couple the rigid wire first end to the body, and a second isolator disposed within the second aperture and defining a third aperture. The at least one HVAC fluid line extends through the third aperture such that the second end supports the at least one HVAC fluid line in a desired orientation. The second isolator is configured to receive the at least one HVAC fluid line and reduce noise, vibration, and harshness between the at least one HVAC fluid line and the rigid wire.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 5 is a perspective view of another HVAC fluid line hanger in accordance with the principles of the present disclosure; and FIG. 6 is a perspective view of yet another HVAC fluid line hanger in accordance with the principles of the present disclosure.

DETAILED DESCRIPTION

Figure 2:
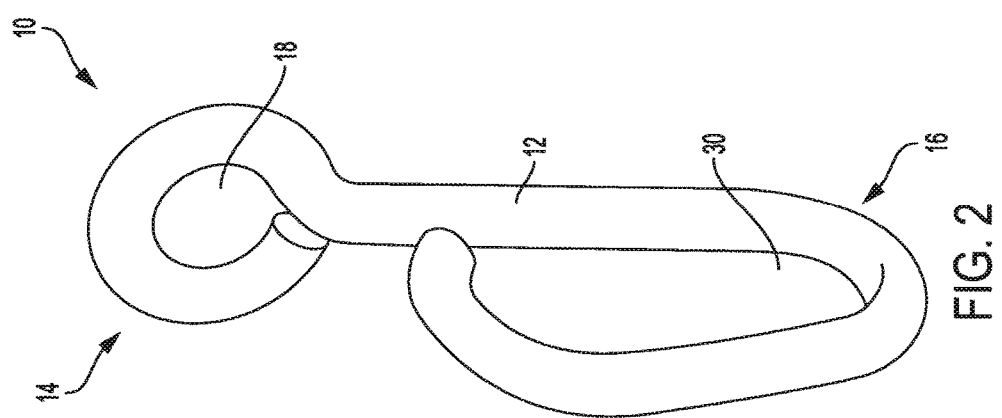
FIG. 2 is a perspective view of a HVAC fluid line hanger in accordance with the principles of the present disclosure.
Figure 1:
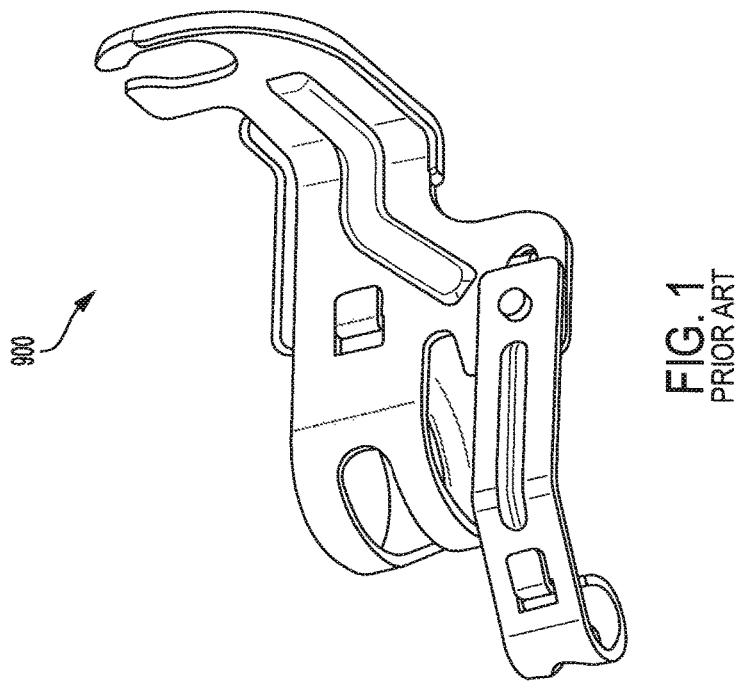
FIG. 1 is a perspective view of a prior art fluid line bracket for a vehicle.
Figure 3:
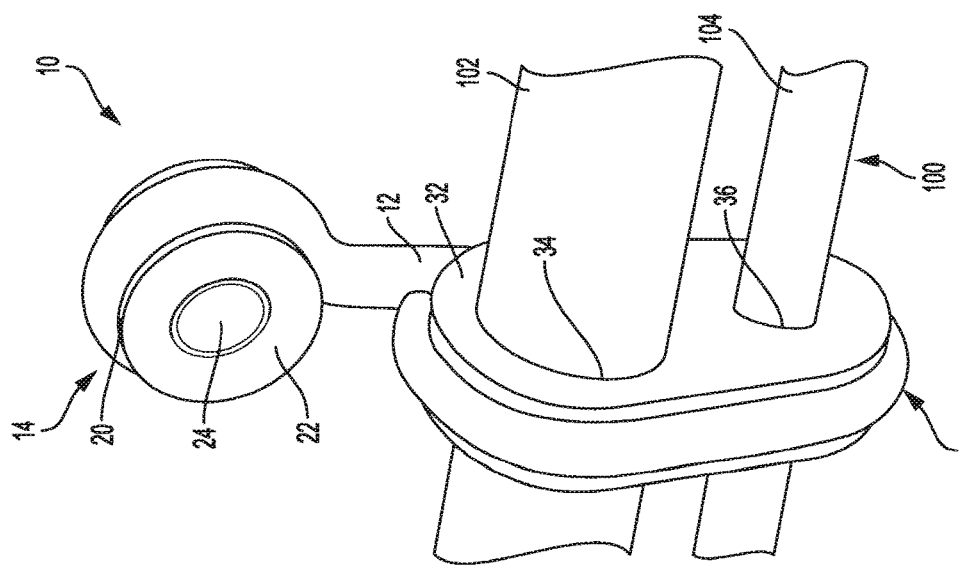
FIG. 3 is a perspective view of the HVAC fluid line hanger shown in FIG. 2 including isolators and supporting HVAC fluid lines, in accordance with the principles of the present disclosure.

With initial reference to FIGS. 2 and 3, an example bracket or hanger for HVAC plumbing or fluid lines is illustrated and generally identified at reference numeral 10. In the example embodiment, HVAC fluid line hanger 10 is formed from a rigid wire 12. In some examples, rigid wire 12 is formed from a metal such as aluminum or steel. However, rigid wire 12 may be fabricated from any suitable material that enables fluid line hanger 10 to function as described herein.

The rigid wire 12 is configured to be cut or sheared to a desired length and then bent or manipulated into a desired shape that will subsequently secure HVAC fluid lines 100 (see FIG. 3) in a desired orientation at a specific location within a vehicle (not shown). As such, HVAC fluid line hanger 10 can be formed into multiple shapes depending on the desired use to accommodate various sized/shaped HVAC fluid lines in various locations of the vehicle. For example, FIGS. 2 and 3 illustrate one particular arrangement of rigid wire 12, while FIGS. 4 and 5 each illustrate other arrangements of the rigid wire 12, as described herein in more detail. Moreover, it will be appreciated that hanger 10 is not limited to securing HVAC fluid lines and may also be utilized to secure other objects (e.g., electrical wiring or copper pipes) to other components (e.g., walls or ceilings).

With continued reference to FIGS. 2 and 3, HVAC fluid line hanger 10 generally includes a first end 14 and an opposite second end 16. First end 14 is shaped or fashioned into a generally circular aperture or eye 18 configured to receive an elastomeric isolator 20 disposed about a bushing 22. As shown in FIG. 3, the bushing 22 defines an aperture 24 configured to receive a fastener (not shown) configured to couple to the vehicle. As such, the fluid line hanger 10 is secured to the vehicle by inserting the isolator 20 and bushing 22 into the eye 18, and subsequently inserting the circular eye 18 and bushing 22 over the fastener. Once hanger 10 is coupled to the vehicle, isolator 20 is configured to reduce noise, vibration, and harshness (NVH) therebetween by isolating the fluid line hanger 10 from the vehicle body.

The hanger second end 16 is shaped or fashioned define an aperture 30 (FIG. 2) configured to receive an elastomeric isolator 32. As shown in FIG. 2, the elastomeric isolator 32 includes a first aperture 34 and a second aperture 36. The first aperture 34 is configured to receive a first HVAC fluid line 102, and the second aperture 36 is configured to receive a second HVAC fluid line 104. In one example, first HVAC fluid line 102 is an AC suction line, and second HVAC fluid line 104 is an AC liquid line. As such, the HVAC fluid lines 102, 104 are secured to the vehicle by inserting the elastomeric isolator 32 into the hanger second end 16. Once the HVAC fluid lines 100 are coupled to the vehicle via the fluid line hanger 10, the isolator 32 is configured to reduce NVH between the fluid line hanger 10 and the HVAC fluid lines 100.

Figure 4:
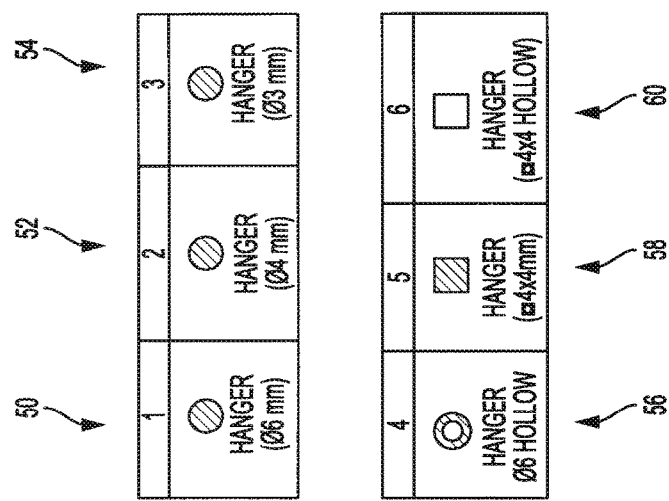
FIG. 4 is a chart showing various cross-sections of the HVAC fluid line hanger shown in FIG. 2, in accordance with the principles of the present disclosure.

With reference now to FIG. 4, the rigid wire 12 can have various cross-sectional shapes and sizes based on strength and/or space requirements. For example, the rigid wire 12 can have a large circular or generally circular cross-section 50, an intermediate circular or generally circular cross-section 52, or a small circular or generally circular cross-section 54. In one example, large circular cross-section 50 has a diameter of 6.0 mm or approximately 6.0 mm, intermediate circular cross-section 52 has a diameter of 4.0 mm or approximately 4.0 mm, and/or small circular cross-section 54 has a diameter of 3.0 mm or approximately 3.0 mm.

As shown, the rigid wire 12 of circular cross-sections 50, 52, 54 is solid. In other examples, the rigid wire 12 has a hollow circular or generally circular cross-section 56. In one example, the hollow circular cross-section 56 has a diameter of 6.0 mm or approximately 6.0 mm. In still other examples, the rigid wire 12 has a solid rectangular or generally rectangular cross-section 58 or a hollow rectangular or generally rectangular cross-section 60. In one example, solid rectangular cross-section 58 has sides of 4.0 mm or approximately 4.0 mm, and hollow rectangular cross-section 60 has sides of 4.0 mm or approximately 4.0 mm.

FIG. 5 illustrates another HVAC fluid line hanger 200 that is similar to hanger 10 except the rigid wire 12 is formed into a different shape to accommodate HVAC fluid lines 100 in a different area and orientation within the vehicle. In the example embodiment, HVAC fluid line hanger 200 generally includes a first end 212, a second end 214, and a third end 216.

First end 212 is shaped or fashioned into a generally circular or oval aperture or eye 218. The eye 218 is configured to receive an elastomeric isolator and bushing (not shown) similar to isolator 20 and bushing 22. The fluid line hanger 200 is secured at least partially to the vehicle by inserting the isolator and bushing into the eye 218, and subsequently inserting a fastener 220 through the eye 218 and bushing to thereby couple the first end 212 to the vehicle. Once the hanger first end 212 is coupled to the vehicle, the isolator is configured to at least partially reduce NVH by isolating the vehicle and hanger first end 212.

The hanger second end 214 is shaped or fashioned into a generally circular or oval aperture or eye 222. The eye 222 is configured to receive an elastomeric isolator and bushing (not shown) similar to isolator 20 and bushing 22. The fluid line hanger 200 is secured at least partially to the vehicle by inserting the isolator and bushing into the eye 222, and subsequently inserting a fastener (now shown) through the eye 222 and bushing to thereby couple the second end 214 to the vehicle. Once the hanger second end 214 is coupled to the vehicle, the isolator is configured to at least partially reduce NVH by isolating the vehicle and hanger second end 214.

The hanger third end 216 is shaped or fashioned into an aperture 228 configured to receive an isolator fastener 230 and thereby couple third end 216 to an HVAC fluid line support or elastomeric isolator 232. The isolator fastener 230 and isolator 232 thus form a device to support the HVAC fluid lines 100. As shown, the elastomeric isolator 232 includes a first aperture 234 and a second aperture 236. The first aperture 234 is configured to receive first HVAC fluid line 102, and the second aperture 236 is configured to receive the second HVAC fluid line 104. As such, the HVAC fluid lines 102, 104 are secured to the vehicle by inserting the fastener 230 into the hanger third end 216 and coupling the hanger 200 to the isolator 232. Once the HVAC fluid lines 100 are coupled to the vehicle via the fluid line hanger 200, the isolator 232 is configured to reduce NVH between the fluid line hanger 200 and the HVAC fluid lines 100.

FIG. 6 illustrates another HVAC fluid line hanger 300 that is similar to hanger 10 except the rigid wire 12 is formed into a different shape to accommodate HVAC fluid lines 100 in a different area and orientation within the vehicle. In the example embodiment, HVAC fluid line hanger 300 generally includes a first end 312, a second end 314, and a third end 316.

First end 312 is shaped or fashioned into a generally circular or oval aperture or eye 318. The eye 318 is configured to receive an elastomeric isolator 320 and bushing 322 similar to isolator 20 and bushing 22. The fluid line hanger 300 is secured at least partially to the vehicle by inserting the isolator 320 and bushing 322 into the eye 318, and subsequently inserting a fastener (not shown) through the eye 318 and bushing 322 to thereby couple the first end 312 to the vehicle body. Once the hanger first end 312 is coupled to the vehicle, the isolator is configured to at least partially reduce NVH by isolating the vehicle and hanger first end 312.

The hanger second end 314 is shaped or fashioned into a generally circular aperture or eye 326 configured to receive an elastomeric isolator 328. As illustrated, the elastomeric isolator 328 includes an aperture 330 configured to receive an HVAC fluid line 106. As such, the HVAC fluid line 106 is secured to the vehicle by inserting the elastomeric isolator 328 into the hanger second end 314. Once the HVAC fluid line 106 is coupled to the vehicle via the fluid line hanger second end 314, the isolator 328 is configured to at least partially reduce NVH between the fluid line hanger 300 and the HVAC fluid lines 100.

The hanger third end 316 is shaped or fashioned into a generally circular aperture or eye 332 configured to receive an elastomeric isolator 334. As shown, the elastomeric isolator 334 includes an aperture 336 configured to receive an HVAC fluid line 108. As such, the HVAC fluid line 108 is secured to the vehicle by inserting the elastomeric isolator 334 into the hanger third end 316. Once the HVAC fluid line 106 is coupled to the vehicle via the fluid line hanger third end 316, the isolator 334 is configured to at least partially reduce NVH between the fluid line hanger 300 and the HVAC fluid lines 100.

Described herein are systems and methods for securing HVAC fluid lines or other lengthy components within a vehicle or other object. The systems include a hanger made from a metal wire instead of sheet metal. One end of the wire is formed with a circular eye to receive a rubber isolator and bushing. The other end of the wire is shaped to receive another rubber isolator that will in turn receive both liquid and suction lines of the AC system. The metal wire is easily formed/manipulated and replaces existing sheet metal brackets that require a more expensive manufacturing process. Accordingly, the wire hangers reduce cost, weight, and manufacturing time/complexity.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle comprising:
    a body;
    an HVAC system having an HVAC suction line and an HVAC liquid line; and
    a hanger configured to couple the HVAC suction and liquid lines to the body, the hanger comprising:
        a rigid wire having a first end and a second end, the first end formed to define a first aperture, and the second end formed to define a second aperture;
        a first isolator disposed within the first aperture and configured to reduce noise, vibration, and harshness between the body and the rigid wire;
        a fastener extending through the first isolator and first aperture to couple the rigid wire first end to the body; and
        a second isolator disposed within the second aperture and defining a third aperture and a fourth aperture;
        wherein the HVAC suction line extends through the third aperture and the HVAC liquid line extends through the fourth aperture such that the second end supports the HVAC suction and liquid lines in a desired orientation;
        wherein the second isolator completely surrounds each of the HVAC suction and liquid lines to reduce noise, vibration, and harshness between the rigid wire and each of the HVAC suction and liquid lines; and
        wherein the hanger includes an absence of any sheet metal.

2. The vehicle of claim 1, wherein:
    the rigid wire is formed from a continuous rigid wire with a constant hollow circular cross-section;
    the third and fourth apertures are completely enclosed by the second isolator; and
    the third aperture is located closer to the first end than the fourth aperture.

3. The vehicle of claim 1, wherein the rigid wire is formed from a continuous rigid wire with a solid rectangular cross-section.

4. The vehicle of claim 1, wherein the rigid wire is formed from a continuous rigid wire with a hollow rectangular cross-section.

5. The vehicle of claim 1, wherein the rigid wire is formed from a continuous rigid wire having a constant hollow circular cross-section.

6. The vehicle of claim 5, wherein the rigid wire includes an absence of welding thereon.

* * * * *